No. 742,093. PATENTED OCT. 20, 1903.
J. T. HENDERSON & J. F. EDGAR.
FISH HOOK.
APPLICATION FILED JAN. 24, 1903.
NO MODEL.
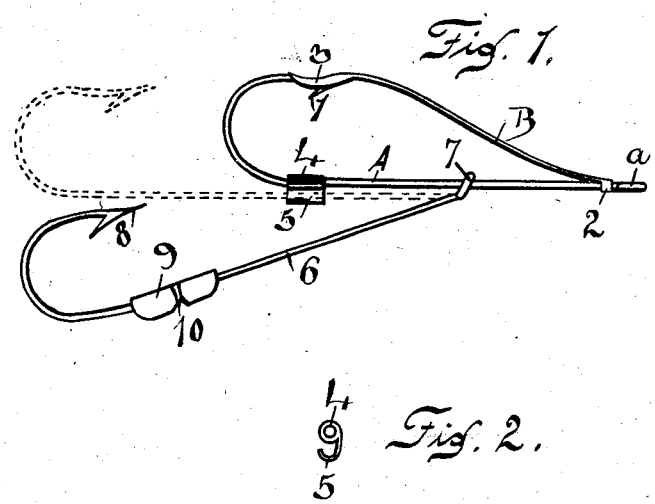
WITNESSES:
Oliver M. Olsen.
Mary C. Michaelsen.
INVENTORS
John T. Henderson
James Franklin Edgar,
BY Geo. W. Iris.
Attorney No. 742,093. Patented October 20, 1903.

UNITED STATES PATENT OFFICE.

JOHN T. HENDERSON AND JAMES FRANKLIN EDGAR, OF COUNCIL BLUFFS, IOWA.

FISH-HOOK.

SPECIFICATION forming part of Letters Patent No. 742,093, dated October 20, 1903.

Application filed January 24, 1903. Serial No. 140,389. (No model.)

*To all whom it may concern:*

Be it known that we, JOHN T. HENDERSON and JAMES FRANKLIN EDGAR, residing at Council Bluffs, in the county of Pottawattamie and State of Iowa, have invented certain useful Improvements in Fish-Hooks; and we do hereby declare that the following is a full, clear, and exact description of the invention, such as will enable others skilled in the art to which it appertains to make and use the same, reference being had to the accompanying drawings, which form a part of this specification.

This invention relates to a new and useful improvement in fish-hooks.

The object of our invention is to provide an improvement in fish-hooks, whereby two fish-hooks, as a lead-hook and a trail-hook, may be adjustably secured one to another, the hooks being held together adjustably and under spring tension.

In connection with fish-hooks, especially in that class where live bait is used, it is desirable to use two hooks, one known as the "lead-hook" and the other as a "trailer," and to the lead-hook is secured the forward end of the bait—as the snout of a frog, for instance—while adjacent the trail-hook is held the trail end of the bait. Now in order to adjust these hooks to any length to accommodate the various-length baits we construct a lead-hook provided with a detent and a trail-hook, which has its eyelet bent at an angle and encompassing the stem of the lead-hook and so arranged that in order to adjustably secure the two hooks the trail-hook must be strained to force its stem into alinement with the stem of the lead-hook, the strained stem then being placed into the detent preferably secured to the lead-hook and to adjustably hold the two hooks in alinement.

In the accompanying drawings we have shown in Figure 1 two fish-hooks constructed according to our invention, while Fig. 2 shows an end view of the detent used in connection with our fish-hooks.

In carrying out the aim of our invention we provide a fish-hook A with the usual eyelet $a$ and the barb 1, as shown. Secured to the stem near the eyelet $a$ are the ears 2 of the spring-stem B of the weed-guard provided above with the spoon 3, the spoon being adapted to contain the barb 1. Secured near the barb end to the hook A is a detent 4, preferably fastened, which below is provided with a hook or stem 5, as shown in Fig. 1.

In connection with the hook A we use a trail-hook 6 with an eyelet 7 bent at an angle thereto, and this eyelet 7 hooks upon the stem A, as shown, this trail-hook being provided with the barb 8. Now this eyelet 7 freely slides upon the stem A, and in order to adjustably secure the trail-hook to the lead-hook it is simply necessary to strain the stem 6 upward to bring the said stem in alinement with the stem of the lead-hook, as is shown in dotted lines, and place the stem into the detent, when it will be impossible to displace these two hooks A and 6 without releasing the same from the detent. This detent while shown as secured to the lead-hook may also be secured to the trail-hook and, if desired, could be made to loosely slide upon the fish-hook stem.

In securing the weed-guard we simply overlap the ears 2 and securely crush and pinch them upon the stem of the hook.

These hooks can be made of various sizes.

Now, having described our said invention, what we claim as new, and desire to secure by United States Letters Patent, is—

The combination with a fish-hook, of a detent secured to said fish-hook, of a second fish-hook, the eyelet of said second fish-hook being bent at an angle to its stem, said eyelet encompassing and freely sliding upon the stem of said first-mentioned hook, said last-mentioned hook being adapted to be bent and strained to be brought in alinement with the first-mentioned hook and be held within said detent.

In testimony whereof we affix our signatures in presence of two witnesses.

JOHN T. HENDERSON.
JAMES FRANKLIN EDGAR.

Witnesses:
GEO. W. SUES,
OLIVE M. OLSEN.